United States Patent [19]
Dobbs

[11] Patent Number: 6,061,486
[45] Date of Patent: May 9, 2000

[54] OPTICAL FIBER LIGHT FIXTURE

[75] Inventor: William C. Dobbs, Burbank, Calif.

[73] Assignee: Glass Illuminations, Inc., Sun Valley, Calif.

[21] Appl. No.: 09/146,694

[22] Filed: Sep. 3, 1998

[51] Int. Cl.[7] ...................................................... G02B 6/32
[52] U.S. Cl. ............................ 385/33; 385/147; 385/901; 385/88
[58] Field of Search ............................ 385/33, 147, 901, 385/115, 116, 88, 93

[56] References Cited

U.S. PATENT DOCUMENTS

4,730,895   3/1988   Siedband et al. .......................... 385/33

*Primary Examiner*—Phan T. H. Palmer
*Attorney, Agent, or Firm*—Bruce A. Jagger

[57] ABSTRACT

The invention relates to a fiber optic light fixture which can generate a thin sheet of incoherent light with sharply defined surfaces that, when projected on the face of an object, produces a line or band of light with sharp, crisp edges. The light fixture elongates the light in the direction of the thin sheet and condenses the light in a direction normal to the thin sheet. One characteristic of the fixture is that objects placed within the beam of light near the fixture do not cast shadows on objects off in the distance.

11 Claims, 5 Drawing Sheets

OPTICAL FIBER LIGHT FIXTURE

BACKGROUND OF THE INVENTION

1. Field of the Invention

The invention relates in general to fiber optic light fixtures and, in particular, to fiber optic light fixtures which generate a thin sheet of incoherent light with sharply defined surfaces. When the sheet or beam of light is projected on the face of an object, a line or band of light with sharp, crisp edges is produced.

2. Description of the Prior Art

Proposals had been previously made for the generation of linear lines of light utilizing fiber optic arrays. See, for example, Siedband et al. U.S. Pat. No. 4,730,895. Siedband et al. discloses a device in which optical fibers are compressed together in a flattened bundle. A lens is focused on the ends of the compressed bundle of fibers, and the resulting light is projected through a distance of up to 2 feet onto a patient. The purpose of Siedband et al. is to precisely locate a spot on the patient for the application of x-rays.

The successful projection of a line or band of light with sharp, crisp edges on an object over distances of several feet or more had generally eluded previous workers.

These and other difficulties of the prior art have been overcome according to the present invention.

BRIEF SUMMARY OF THE INVENTION

A preferred embodiment of the fiber optic light fixture according to the present invention comprises an array of optical fibers or filaments mounted in a spaced apart relationship in an array member. In one embodiment the array member comprises a plate with a line of substantially evenly spaced holes formed therein. An optical fiber is received in each hole. The dimensions and locations of the holes are such that the optical fibers are held in a substantially parallel, generally even, spaced apart relationship. The fibers are preferably round in cross-section. The longitudinal axes of the optical fibers, along which light is emitted from the outlet ends of the fibers, are thus substantially parallel. The outlet ends are arranged in a fiber optic array. The fiber optic array defines an array line. According to one embodiment, the surfaces which form the outlet ends of the fibers are generally flush with or at least substantially uniformly spaced from the surface of the array member. When illuminated, each optical fiber generates a cone of light at its outlet end. The cone is generally a right cone symmetrically disposed around the axis of the optical fiber from which it is emitted, and with an apex angle of approximately 30 degrees. The cones of light are emitted in a first direction, that is, towards an elongated lens.

In one embodiment of the present invention, the cones of light intersect adjacent cones prior to interacting with the elongated lens. The elongated lens is substantially uniformly spaced from the array line. The lens is not focused on the outlet ends of the optical fibers. Instead, the lens focuses on a point within the cones of light rather than on the ends of the optical fibers. The proper positioning of the lens relative to the fiber optic array is determined by a process of iteration to establish a sheet or beam of light with sharply defined opposed sides or surfaces. The distance between the elongated lens and the fiber optic array is adjusted in small increments, while maintaining the longitudinal axis of the lens parallel to the fiber optic array, until the "zone of sharpness" is located. The zone of sharpness is that region within which the sheet or beam of light from the fiber optic array produces the most sharply defined opposed sides or surfaces of the sheet or beam. These sharply opposed sides or surfaces of the sheet or beam of light, when projected on an object extending substantially normal to the direction of the light, will form a line or band of light with sharp, crisp edges. The edges, at about 1 foot from the lens, generally have a width of less than about 1 millimeter (0.038 inches in one test). That is, the projected band of light, as it appears on the surface against which it is projected, goes from full light to no light in a distance of less than about a millimeter. When, for example, the light is positioned to precisely graze, but not illuminate, a flat surface, it will fully illuminate objects which project from the surface by less than about a millimeter, without illuminating the surface itself. The sharp edges are also visible when smoke or dust particles pass through the light beam. This provides for very close control of the illumination of textured surfaces, even when the relief of the surface is relatively small. A very sharp contrast between the illuminated and non-illuminated areas is thus created, without light spilling out into areas where it is not desired or needed. Very striking effects are thus achieved. As the distance from the fixture increases the sharp edge becomes wider, roughly in the same proportion that the sheet or beam of light expands.

The light which is emitted from the optical fiber light fixture is in the form of a thin sheet or beam which conforms to the shape of the fiber optic array. The thin sheet of light is in a flat planar in configuration when the array member holds the outlet ends of the optical fibers in a straight line. When the array member holds the outlet ends in an arcuate configuration, and the lens conforms to that arcuate configuration, the thin sheet of light will be correspondingly arcuate. Hence the sheet or beam of light emitted from the fixture is not limited to flat planar configurations.

The fiber optic light fixture can be configured so that the sheet or beam of light which it generates can be tailored to fit a variety of applications. Excess light, which must be shuttered or otherwise controlled, is not generated. Only enough energy is expended to generate that amount of light which is required to create the desired sheet or beam of light. Because of the efficient use of the light, the amount of energy expended in creating the desired illumination is minimized.

In one typical configuration, when a single row of 0.040 diameter fiber optic outlet ends defines the fiber optic array, and a rod lens having a diameter of 1 inch is used, the sheet or beam of light which is generated will expand to a thickness of about 6 inches at a distance of about 10 feet from the fixture. Thereafter, the sheet or beam of light will expand about another 6 inches in thickness for every additional 10 feet of distance from the fixture. The surfaces of the sheet or beam of light will remain sharp and well defined for several hundred yards or more. In general, the sheet or beam of light fans out laterally.

It is a characteristic of a sheet or beam of light generated using the fiber optic fixture of the present invention that a relatively narrow object placed within the sheet or beam of light, particularly when placed close to the fixture, will not cast a shadow.

Several array lines of outlet ends can be provided, if desired, in one fiber optic light fixture. By combining three fiber optic arrays in one fiber optic fixture, for example, permits the projection of three separate sharp edged lines or bands of light on a surface. Various sources of light can be used as input to the optical fibers. The use of different colored lighting for each array, for example, red, white and blue, can be provided to achieve a variety of different combinations of sharply defined sheets of light.

In one convenient form of the present invention the output lens is a cylindrical rod positioned so that the longitudinal axis of the cylindrical rod is parallel to and spaced a constant distance from the array line. A wide variety of lenses may be used, including, for example, linear round lenses, linear half round lenses, frensnel lenses, holographic diffuser lenses, various other condensing lenses, and the like.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of fiber optic light fixtures. While the description which follows hereinafter is meant to be representative of a number of such applications, it is not exhaustive. As those skilled in the art will recognize, the basic methods and apparatus taught herein can be readily adapted to many uses other than those specifically described. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration and not limitation.

DETAILED DESCRIPTION OF THE PREFERRED EMBODIMENTS

Figure 1:
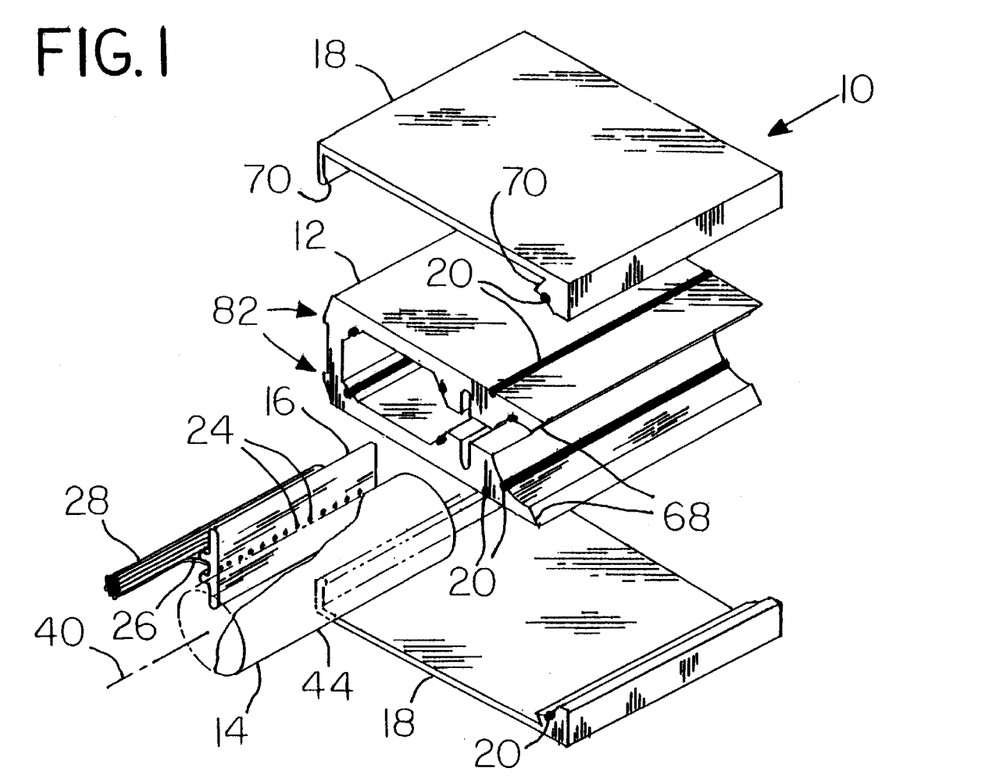
FIG. 1 is an exploded perspective view of one embodiment of the present invention.
Figure 2:
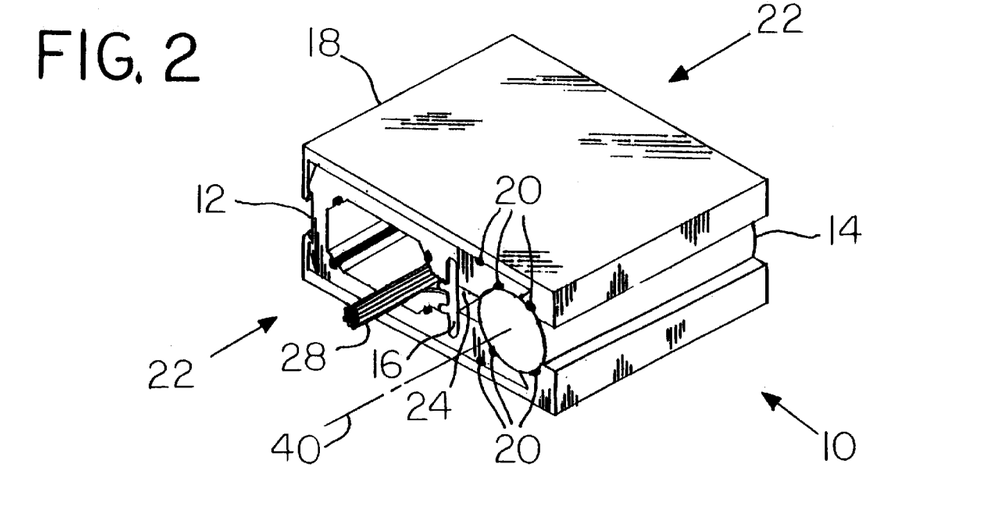
FIG. 2 is an assembled perspective view of the embodiment shown in FIG. 1.

In the preferred embodiment which has been selected for purposes of illustration, and with particular reference to FIG. 1 and FIG. 2, there is illustrated generally at 10, a fiber optic light fixture that emits a sheet or beam of, or sheets or beams of, incoherent light. The embodiments of the fiber optic light fixture illustrated and discussed herein are generally adapted for external or underwater use. The selection of an external or underwater embodiments for purposes of illustration is not to be construed as a preference over interior embodiments. A housing member 12 is adapted to precisely maintain the relationship between the elongated lens 14 and the array member 16. Lens locks 18 snappedly engage with the housing member 12 at the locations generally shown at 82. O-ring seals 20 cooperably engage between the lens 14, the lens locks 18, and housing member 12, to achieve a waterproof seal. The ends of the fixture, generally illustrated at 22 are also sealed, by means well known to those skilled in the art, to establish a generally waterproof fiber optic light fixture. For example, aluminum end plates can be attached to ends 22 with screws to achieve a waterproof seal when used with silicone seal, or the like, applied between them.

Figure 5A:
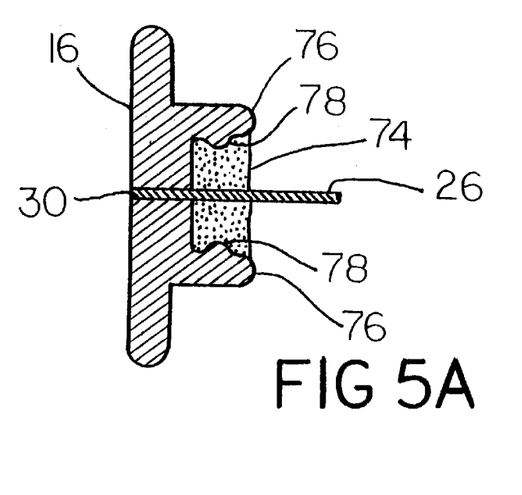
FIG. 5A is a cross-sectional view of the array member illustrating one configuration of the outlet ends of the optical fibers of the present invention.
Figure 5B:
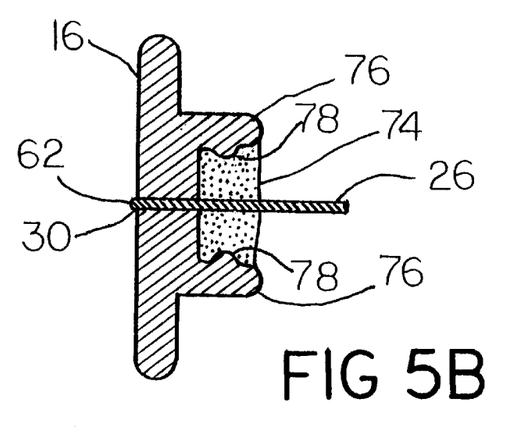
FIG. 5B is a cross-sectional view of the array member illustrating another configuration of the outlet ends of the optical fibers of the present invention.

The array member 16 includes, for example, a plurality of closely sized openings 24, each opening adapted to receive an optical fiber 26 from a bundle of optical fibers or filaments 28. The dimensions and locations of the closely sized openings 24 are such that the optical fibers are held in a substantially parallel, generally even, spaced apart relationship. The optical fibers 26 are preferably round in cross-section, although other configurations can be used. Each optical fiber 26 has an outlet end 30, as shown in FIGS. 5A and 5B. The longitudinal axes of the optical fibers 26 adjacent their outlet ends 30 are held substantially parallel by the closely sized openings 24 of the array member 16. The outlet ends 30 establish a fiber optic array, generally shown at 32 in FIG. 9.

The optical fibers 26 can be secured in place with the array member by the use of glue, thermoplastic, or the like. Preferably, as shown in FIGS. 5A and 5B, optical fibers or filaments 26 are glued in place to array member 16 with an epoxy 74. The array member 16 includes two legs or glue dams 76 to contain the epoxy as it solidifies to bond the optical fibers to the array member. Lumps or ridges 78 can be provided to assure that even if the hardened epoxy 74 separates from the surface of the array member 16, the optical fibers 26 will still be held in place.

Figure 4:
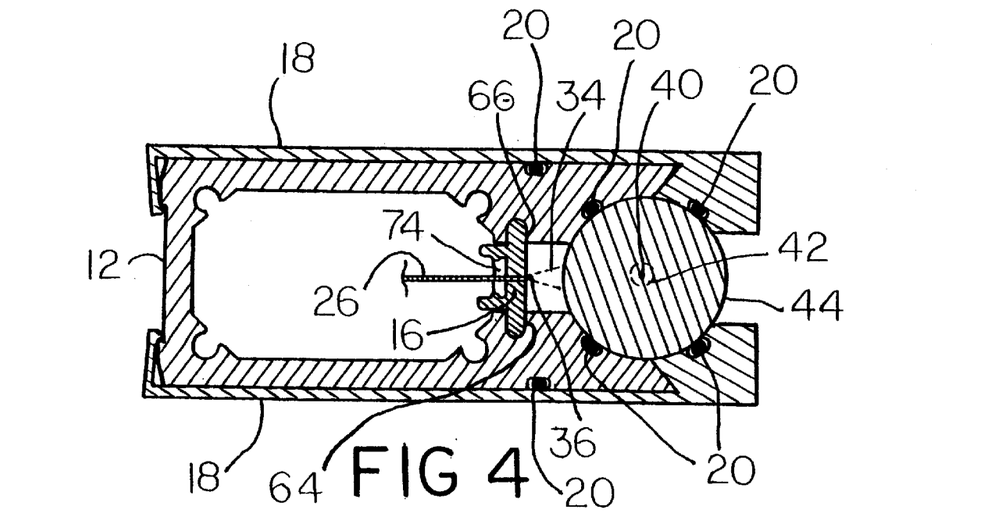
FIG. 4 is a cross-sectional view of the assembled embodiment shown in FIG. 2.
Figure 6:
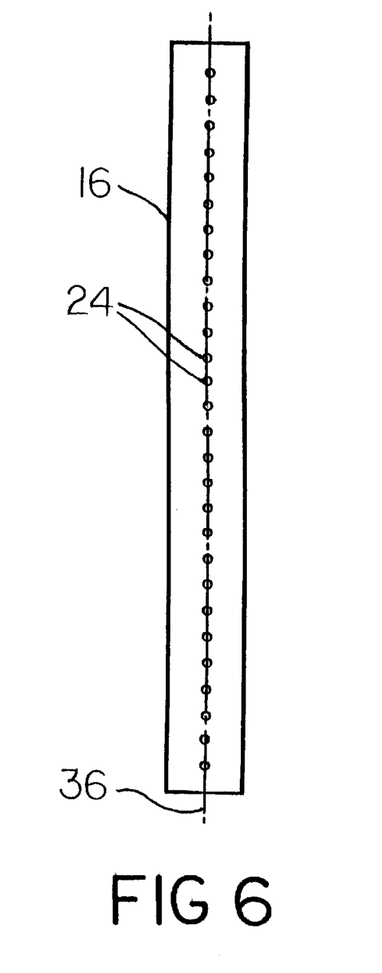
FIG. 6 is a plan view of an array member of the present invention.
Figure 9:
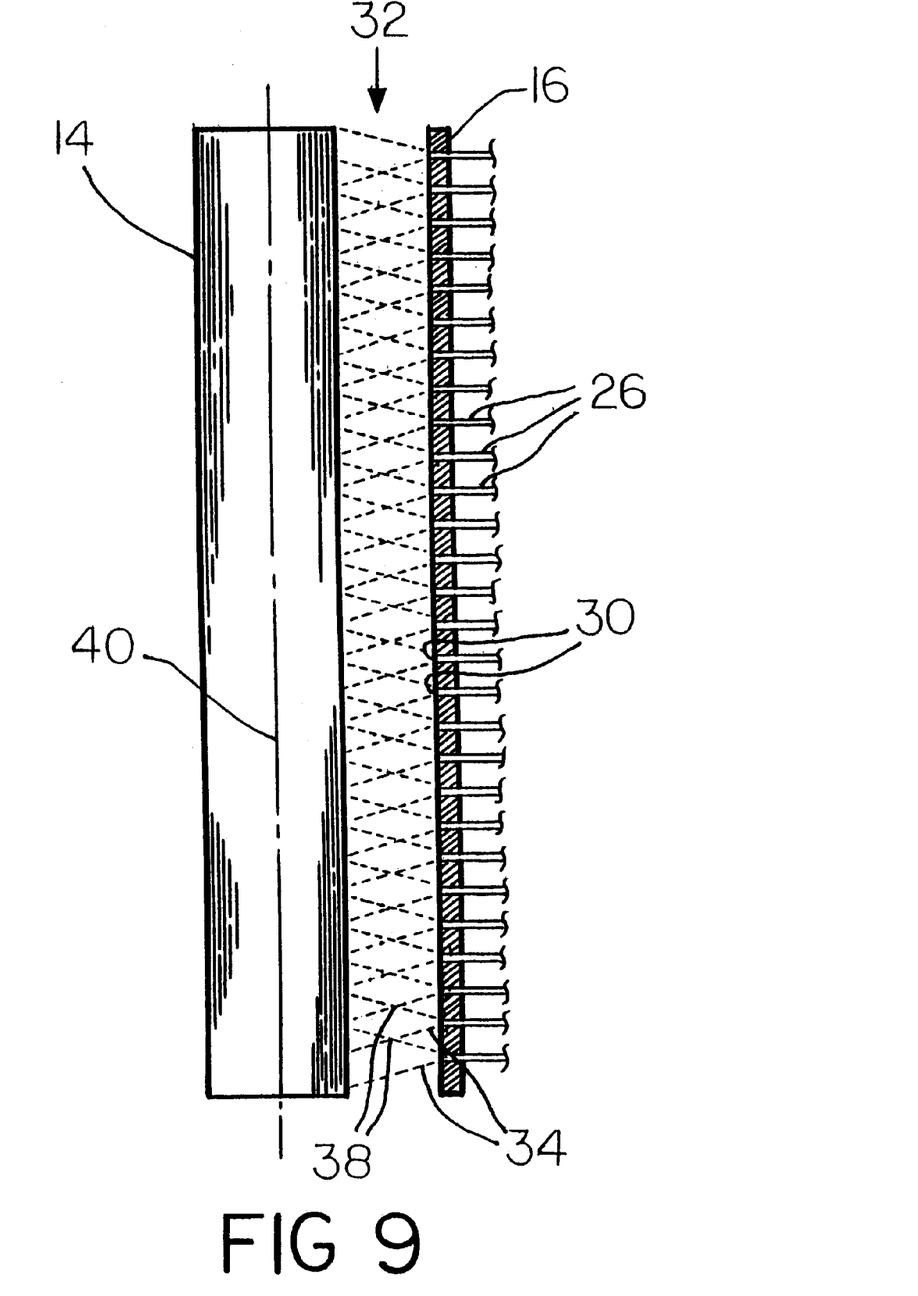
FIG. 9 is a cross-sectional side view of the array member of the embodiment shown in FIG. 6 overlaid with the position of the lens and cones of light of the present invention.

The fiber optic array 32 generally defines an array line 36, shown in FIGS. 4 and 6. When illuminated, each optical fiber 26 of the fiber optic array 32 generates a cone of light 34 emitted in a first direction, that is, toward lens 14. Each cone of light is generally a right cone symmetrically disposed around the axis of its respective optical fiber outlet end 30 with the apex originating at the outlet end. The apex angle is approximately 30 degrees for an optical fiber of 0.040 inch in diameter. Preferably, each cone of light intersects with its respective adjacent cone of light at a location which is spaced from the surface of the array member, and from the outlet end of the fiber. The intersections 38 of the cones, as shown in FIG. 9, established by closely spacing the fibers on the array line, generally increases the sharpness of the opposed sides or surfaces of the sheet or beam of light. Additionally, the intensity of the beam of light can be increased by reducing the spacing between each optical fiber in the fiber optic array which in turn shortens the distance between the intersections 38 of each cone of light and the surface of the array member 16. Although illustrated in FIG. 9, it is noted that, according to the present invention, the cones of light need not intersect prior to their piercing the lens surface.

The same output light level can be achieved regardless of the spacing of the optical fibers, but at the expense of power consumption. When the fibers are spaced far apart, a given output light level is achieved by consuming more power than if the fibers are spaced close together. Spacing the fibers close together reduces power consumption but increases the cost of the fixture. Typically, in this configuration, each cone of light will intersect adjacent cones of light prior to interacting with the lens. The use of less optical fibers spaced apart at long distances decreases the cost of the fixture but increases power consumption. Typically, in this configuration, each cone of light will not intersect adjacent cones of light prior to interacting with the lens. Hence the cost of a fixture is typically balanced against its power consumption, which in turn effects the spacing between the optical fibers, which is dictated by the number and spacing of the optical fibers in the array, which in turn effects whether each cone of light will or will not intersect each adjacent cone before interacting with the lens.

Preferably, the fibers are evenly spaced in the array member, however, this is not essential. Irregular spacing, so long as it is not so extreme as to cause a lack of uniformity in the sheet or beam of light, is possible. Alignment between the array line 36 and the longitudinal axis 40 of the lens is, however, critical to the functioning of the fixture. This alignment must be within a few thousandths of an inch, say, plus or minus 0.002 inches, over the length of the fixture. This tolerance of plus or minus 0.002 inches is achieved by using set screws, not shown, to bias the array member to seat against the precision machined surfaces 64 and 66 of the housing member 12. Preferably silicone seal or its equivalent is placed over the set screw to prevent moisture from entering. In addition, it is preferred to have stop edges 68 in the housing member 12 and stop groves 70 in the lens locks 18 to eliminate undesirable deflection of the housing member when the lens locks are snappedly engaged. By preventing this undesirable deflection, the position of the lens can be controlled within the tolerance required.

The longitudinal axis 40 of the elongated lens 14 is held substantially parallel with the array line 36. It should be noted that the lens 14 is not focused on the outlet ends of the optical fibers, but rather on the cones of light 34 of the fiber optic array 32. The proper positioning of the lens 14 relative to the fiber optic array 32 is determined by a process of iteration in order to establish a sheet or beam of light with sharply defined opposed sides or surfaces. The distance between the lens 14 and the fiber optic array 32 is adjusted in small increments, while maintaining the longitudinal axis 40 parallel to the fiber optic array 32, until the zone of sharpness 42 is located (FIG. 4). The zone of sharpness 42 is that region within which the light from the fiber optic array 32 will form a sheet or beam of light with the most sharply defined opposed sides or surfaces. These sharply defined sides or surfaces, when projected on an object extending substantially normal to the direction of light, will form a line or band of light with sharp, crisp edges. The edges, at about 1 foot from the lens, generally have a width of less than about 1 millimeter (0.038 inches in one test). That is, the projected sheet or beam of light, as it appears on the surface against which it is projected, goes from full light to no light in a distance of less than about a millimeter.

It is necessary to determine the location of the zone of sharpness 42 by a process of iteration because so many variables enter into its location. The refractive characteristics of the lens material, the type, size, and configuration of the lens, and the like, all enter into determining the positioning of the zone of sharpness. The characteristics and shape of the fiber optic outlet ends will also influence the positioning of the zone of sharpness. Once the zone of sharpness is located for a particular configuration, the housing member 12 can then be precisely designed to reproducibly maintain the zone of sharpness for each fixture made in that configuration. The housing member 12 is generally formed by machining or precise extrusion or molding since it must hold the functional parts of the fixture in close alignment and maintain the fixture within the zone of sharpness. The housing member can be made from most any substantially rigid material. It is generally required that the selected material be able to precisely maintain the tolerances necessary to reproducibly establish the zone of sharpness for a given configuration light fixture. Typically, extruded aluminum is generally preferred for internal and external applications while copper, brass, bronze, and stainless steel are generally preferred for underwater applications. The array member is typically made from the same substantially rigid material selected for the housing member although a different material could be used.

The optical fibers which are suitable for use according to the present invention are conventional and well known to those skilled in the art. The diameter of the fiber dictates the diameter of the cone of light at a set distance from the fiber optic array. This in turn influences the size of the lens, the spacing of the optical fibers in the array, and the location of the intersections of the cones of light. In the embodiment shown in FIGS. 1, 2 and 4, for a optical fiber diameter of 0.040 inches, a spacing of from about 1 inch to 0.070 inches between each of the fibers, and a cylindrical rod lens diameter of 1 inch, the zone of sharpness is obtained at a spacing of approximately 0.230 inches from the surface of the array member and the surface of the lens. This configuration is scaleable, for example, with a fiber diameter of 1 inch, the cylindrical rod lens would be as large as 6 inches, or larger, with the other dimensions being correspondingly enlarged. Such a large fixture would be suitable for outdoor lighting requirements such as, for example, landing fields, large buildings, and the like. Such a large fixture would be capable of projecting a sharp edged line or band of light on low to mid-level clouds for advertising purposes. In general, with cylindrical lenses, the larger the diameter of the lens, the narrower the beam of light. Fiber diameters ranging from, for example, about 0.0120 to 1 inch, more or less, are suitable for use according to the present invention. For reasons of ease of fabrication, plastic fibers are preferred over glass.

The elongated lens 14 extends generally parallel to and spaced a substantially uniform distance from the fiber optic array. Generally, the lens elongates the light received from the cones of light along its longitudinal axis and condenses the light in a lateral direction. The characteristics of the lens are preferably constant along the entire length of its longitudinal axis 40. Generally, the cross section of the lens remains constant along the axis of the lens which parallels the fiber optic array. In the embodiments shown in FIGS. 1, 2, 3, 4 and 7, lens 14 is a cylindrical rod positioned so that its longitudinal axis is parallel to and spaced a constant distance from the fiber optic array. The distance is determined once the zone of sharpness has been established. A wide variety of lens shapes may be used including, for example, linear round lenses, linear half round lenses, frensnel lenses, holographic diffuser lenses, various other condensing lenses, and the like. Regardless of the type of lens, it should be positioned within the zone of sharpness. A tolerance of a few thousandths of an inch from the optimum position is permitted, for example, plus or minus 0.005 thousandths of an inch. Moving the lens more than a few thousands of an inch away from the optimum position of sharpness tends to cause a loss of intensity as well as a decrease in the sharpness of the surface edges of the sheet or beam of light. Also, moving the lens so as to focus it on the outlet ends of the optical fibers causes images of the fiber ends to appear as fuzzy elliptical dots when the sheet or beam of light is projected on the face of an object extending generally normal to the plane of the sheet or beam of light. A sharp edge is not produced when the lens is focused on the ends of the optical fibers. Focusing the lens on a plane spaced away from the outlet ends increases the sharpness of the edges of the line or band of light when projected on an object. When the lens is positioned within the zone of sharpness, even a single fiber will produce a sharp edged sheet or beam of light which extends for the full length of, for example, a 3 inch long lens, although it is of very low intensity and tapered on the ends. When projected on an object, the resulting line or band tends to become oblong at its ends, and also the intensity of the light falls off at its ends.

The light which is emitted from the optical fiber light fixture is in the form of a thin sheet or beam of light which generally has the form of the fiber optic array. When the array line or band of the fiber optic array is a straight line, the thin sheet or beam of light will be a flat planar in configuration. This configuration has many uses. When, for example, the thin sheet or beam of light is positioned to precisely graze, but not illuminate, a flat surface, it will fully illuminate objects which project from the surface by less than about a millimeter, without illuminating the surface itself. The sharp edges are also visible when smoke or dust particles pass through the sheet or beam of light. This provides for very close control of the illumination of textured surfaces, even when the relief of the surface is relatively small. A very sharp contrast between the illuminated and non-illuminated areas is created, without light spilling out into areas where it is not desired or needed. Very striking effects are thus achieved. As the distance from the fixture increases, the sharp edges become wider, roughly in the same proportion that the sheet or beam of light expands.

The array line 36 is not limited, according to the present invention, to being a straight line. For example, if the array line 36 of the outlet ends 30 of the optical fibers 26 is in an arcuate configuration, and the lens 14 conforms to that arcuate configuration, the thin sheet or beam of light will be correspondingly arcuate. Hence other configurations of the present invention are possible since the thin sheet or beam of light need not be limited to flat planar configurations.

According to the embodiment shown in FIGS. 1, 2, and 4, and referring to FIG. 5A, the outlet ends 30 of the optical fibers or filaments 26 are prepared by conventional procedures which typically involve cutting the fibers at the surface of the array member 16 with a hot knife. This produces a generally planar fiber end which exhibits some striations due to action of the hot blade. In an alternate configuration, referring to FIG. 5B, the outlet ends 30 of the optical fibers or filaments 26 can be improved by heating them to their melting point and allowing them to form a somewhat convex shape 62 as dictated by surface tension. The melting process removes the striations caused by the cutting operation and thus improves the sharpness of the edge formed by the sheet or beam of light, as well as the intensity of the light. The outlet ends 30 should be held level while they solidify so that the convex formed in situ ends form symmetrically around their respective longitudinal axis. Melting of the outlet end is conveniently accomplished by brushing it with a flame (flame polishing), by radiant heat, or the like. Once sufficient heat has been added to bring each fiber end to the melting point, the heat must then be removed and the fibers allowed to cool until solidified.

In the embodiment shown in FIGS. 1, 2, and 4, when a single row of 0.040 inch diameter fiber optic outlet ends 30 define the fiber optic array 32, and a cylindrical rod lens 44 having a diameter of 1 inch is used, the sheet or beam of light which is generated will expand to a thickness of about 6 inches at a distance of about 10 feet from the fixture. Thereafter, the sheet or beam of light will expand about another 6 inches in thickness for every additional 10 feet of distance from the fixture. Hence, at close distances the light appears as a sheet of light and at greater distances it appears as a beam of light. Regardless, the surfaces of the sheet or beam of light will remain sharp and well defined for several hundred yards or more. Increasing the diameter of the cylindrical rod lens will decrease the width of the sheet or beam, and also the width of the sharp sides or surfaces of the sheet or beam. In general, the sheet or beam of light fans out laterally. For example, at a distance of about 10 feet from a fixture with a 1 inch diameter rod lens which is about 4 feet long, the sheet or beam of light will be about 6 inches thick and about 10 feet wide. Some light spills laterally for about 3 feet on either side of the 10 foot width. This lateral spill light generally tapers off in thickness and intensity, and does not have a well defined edge.

It is a characteristic of the sheet or beam of light generated by the fiber optic fixture of the present invention that a relatively narrow object placed within the sheet or beam of light, particularly when placed close to the fixture, will not cast a shadow. For example, a person standing in the way of the sheet or beam of light and about 2 feet away from a fixture will not cast a shadow on a surface twenty feet away. This is believed to occur because the light emitted from each of the respective optical fiber outlet ends is greatly elongated in the plane of the sheet or beam of light, and condensed laterally, by the elongated lens. Where two or more fixtures are used, all arranged so as to illuminate the same object, generally all obstructions interfering with the light beams will be illuminated, but they will not cast shadows. This provides very interesting illumination for aesthetic purposes. The surface of a building may be illuminated, for example, without interference from tree branches. Where uniform lighting is required for safety purposes, such as a sidewalk, it is readily provided according to the present invention.

The fiber optic fixture can be configured so that the sheet or beam of light which it generates is tailored to fit a specific application. Excess light, which must be shuttered or otherwise controlled, is not generated. Only enough energy is expended to generate that amount of light which is required to create the desired sheet or beam of light. Thus, only enough energy is consumed to illuminate the precise area desired, and nothing more. Because of the efficient use of the light, the amount of energy expended in creating the desired illumination is minimized. This is very advantageous in architectural lighting applications, as well as in the lighting of art objects.

By the inclusion of additional fiber optic arrays, multiple sheets of light can be emitted from one light fixture of the present invention. Two parallel array lines of outlet ends can, for example, be spaced apart half a diameter width of the lens in a flat array member, in which two distinct sheets or beams of light will be generated. There will be some loss in sharpness of the edges of the projection of the two sheets or beams of light on a surface unless the array member is curved so as to follow the curvature of the lens. If two or more fiber optic arrays are used, the array lines of each of the fiber optic arrays should be parallel with the longitudinal axis of the lens.

Figure 3:
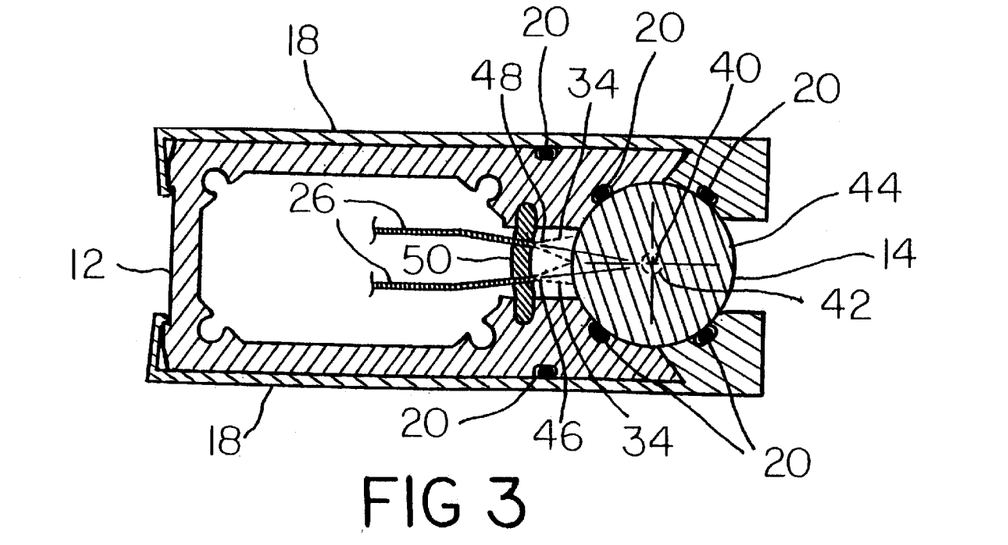
FIG. 3 is a cross-sectional view of an alternative embodiment of the present invention.

For example, shown in FIG. 3 is an alternate embodiment of the present invention which emits two separate sheets or beams of light emanating from two separate fiber optic arrays, labeled 46 and 48 respectively. Array member 50 is curved so as to follow the curvature of lens 14 to position the outlet end of each optical fiber in each fiber optic array the same distance from the longitudinal axis of the lens. Hence, the zone of sharpness is maintained for each fiber optic array providing for two separate sharp edged sheets of light to be emitted. Similarly, three or more fiber optic arrays can be used to generate three or more separate sharp edged sheets of light on a surface. The use of different colored lighting for each array provides, for example, a red, white and blue banner of light with sharply defined boundary lines between the colors.

Figure 7:
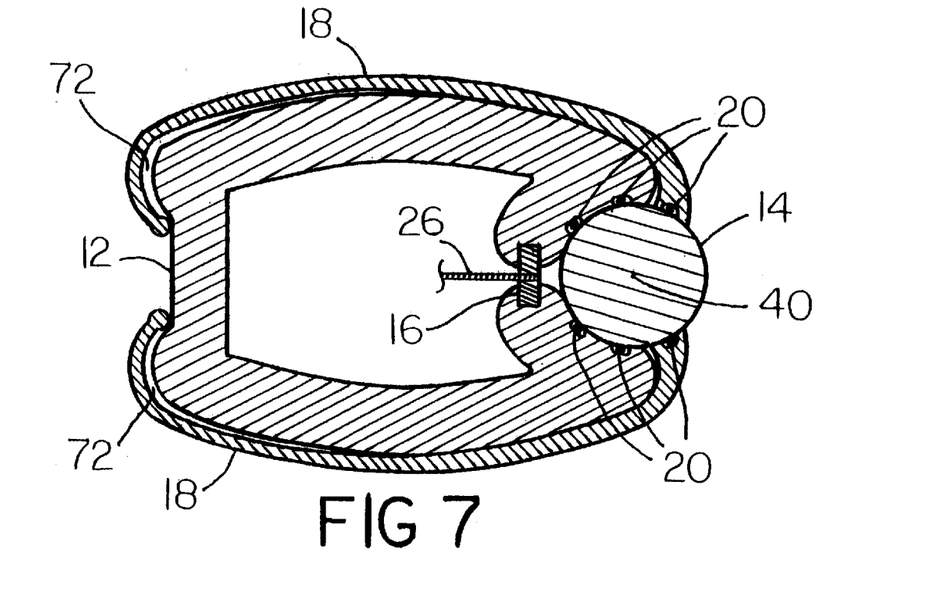
FIG. 7 is a cross-sectional view of an alternative embodiment of the fiber optic light fixture of the present invention.

An embodiment adapted for internal use is shown in FIG. 7 wherein the precisely formed housing member 12 and lens locks 18 form a generally elliptical cross-sectional shape. In this embodiment, lens 14 protrudes from the lens locks to allow for cleaning of the lens. This is desirable in internal applications. In external applications, it is preferred to recess the lens among the lens locks to provide for protection from the environment. It should be noted that the embodiment in FIG. 7 does not seal the area 72, between the lens lock 18 and the housing body 12, from moisture. For internal applications it has been found it is not necessary to seal this area, but it is advantageous to do so in external and underwater applications to insure a waterproof seal for the fixture.

Figure 8:
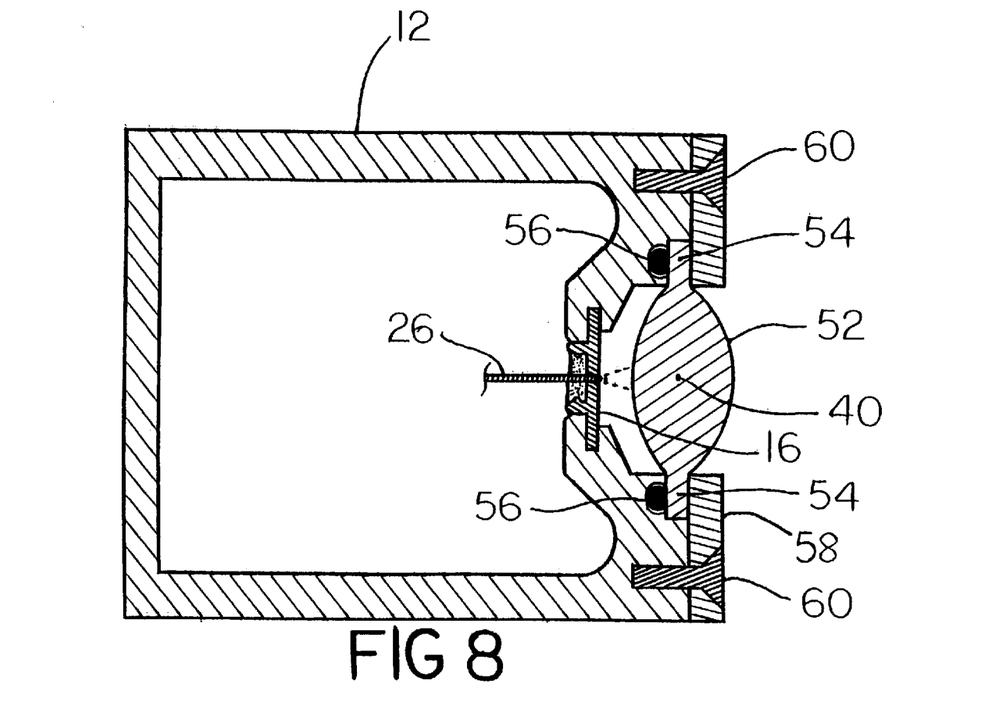
FIG. 8 is a cross-sectional view of another alternative embodiment of the fiber optic light fixture of the present invention.

Another underwater embodiment is shown in FIG. 8 wherein a linear round lens 52 is used instead of a cylindrical rod. Flat ends 54 of the lens seal against linear O-ring seals 56 to waterproof the fixture. The seal is completed with a plate 58 attached to the housing body 12 with screws 60. In this embodiment snappedly engaging lens locks 18 are not required. In addition, it is preferred that all components in this embodiment, other than the optical fiber, lens, and O-rings, be made from copper, brass, bronze, or stainless steel so as to prevent corrosion. Preferably the housing body 12 and array member 16, in this embodiment, are cast from bronze.

Various sources of light can be used for the input to the optical fibers, particularly different color of light. Such sources are well known to those skilled in the art.

What has been described are preferred embodiments in which modifications and changes, substitutions and reversals of parts may be made without departing from the spirit and scope of the accompanying claims.

What is claimed is:

1. A fiber optic light fixture for generating a sheet or beam of light which has sharply defined opposed surfaces, said fiber optic light fixture comprising:

a plurality of optical fibers, each such optical fiber including an outlet end adapted to emit a cone of light in a first direction;

an array member, said outlet ends being mounted to said array member in a fiber optic array, said fiber optic array defining an array line; and an elongated lens having a longitudinal axis, said longitudinal axis being spaced from and substantially parallel to said array line, said elongated lens being adapted to elongate said cones of light along said longitudinal axis and to condense said cones of light in a lateral direction, said elongated lens being positioned within a zone of sharpness, the location of said zone of sharpness being determined by adjusting the distance between said longitudinal axis and the array line while observing the edges of the projection of the resulting sheet of light on a surface positioned substantially normal to said first direction, said zone of sharpness being where said edges are the sharpest.

2. An optical fiber fixture of claim 1 including a second fiber optic array defining a second array line.

3. An optical fiber fixture of claim 1 wherein said outlet end comprises a formed in situ convex surface.

4. An optical fiber fixture of claim 1 wherein said elongated lens comprises a cylindrical rod.

5. An optical fiber fixture of claim 1 wherein said outlet ends are convex.

6. An optical fiber fixture of claim 1 wherein said array line is a straight line.

7. A method of generating a sheet of incoherent light with sharply defined sides, said method comprising:

providing a plurality of fiber optic outlet ends positioned in a fiber optic array;

providing an elongated lens having a longitudinal axis positioned in a zone of sharpness relative to said fiber optic array, said elongated lens being adapted to elongate light received from said fiber optic outlet ends along said longitudinal axis and to compress such light in a direction which is generally normal to said longitudinal axis;

supplying light to said elongated lens through said fiber optic outlet ends; and allowing said supplied light to exit said elongated lens as a sheet of light having sharply defined sides.

8. A method of claim 7 including providing a cylindrical rod lens.

9. A method of forming an outlet end of a fiber optic filament, said method comprising:

mounting a fiber optic filament through a closely sized opening in an array member so that said filament projects beyond a face of said array member;

trimming said filament so that it is flush with said face to form a rough outlet end;

holding said array member so that said rough outlet end is substantially level; and heating said rough outlet end to at least its melting point and allowing it to cool until it is solidified to form said outlet end.

10. A method of claim 9 including heating said rough outlet end with an open flame.

11. A method of claim 9 including heating said rough outlet end with radiant heat.

\* \* \* \* \*

UNITED STATES PATENT AND TRADEMARK OFFICE
CERTIFICATE OF CORRECTION

PATENT NO. : 6,061,486
DATED : May 9, 2000
INVENTOR(S) : William C. Dobbs

It is certified that error appears in the above-identified patent and that said Letters Patent is hereby corrected as shown below:

Column 1,
Line 2, should read as follows:
-- This application claims the benefit of U.S. Provisional Patent application No. 60/057,816, filed on September 04, 1997 --

Signed and Sealed this

Seventeenth Day of February, 2004

JON W. DUDAS
*Acting Director of the United States Patent and Trademark Office*